(12) United States Patent
Gilboy et al.

(10) Patent No.: US 10,721,512 B2
(45) Date of Patent: *Jul. 21, 2020

(54) METHOD AND APPARATUS FOR SATELLITE TELEVISION SERVICE WITH ALTERNATE DELIVERY CAPABILITIES

(71) Applicants: AT&T Intellectual Property I, L.P., Atlanta, GA (US); AT&T Mobility II LLC, Atlanta, GA (US)

(72) Inventors: Christopher P. Gilboy, Freehold, NJ (US); Matthew Pitz, Downingtown, PA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,161

(22) Filed: Jan. 24, 2019

(65) Prior Publication Data

US 2019/0174164 A1   Jun. 6, 2019

Related U.S. Application Data

(63) Continuation of application No. 15/704,309, filed on Sep. 14, 2017, now Pat. No. 10,231,002, which is a (Continued)

(51) Int. Cl.
*H04N 21/274* (2011.01)
*H04N 21/266* (2011.01)
(Continued)

(52) U.S. Cl.
CPC .......... *H04N 21/266* (2013.01); *H04H 40/90* (2013.01); *H04H 60/11* (2013.01); *H04H 60/82* (2013.01);
(Continued)

(58) Field of Classification Search
None
See application file for complete search history.

(56) References Cited

U.S. PATENT DOCUMENTS 5,586,121 A   12/1996  Moura et al.
5,741,574 A    4/1998  Boyce et al.
(Continued)

FOREIGN PATENT DOCUMENTS

CA   2269905 A1   4/1999
CA   2253109 A1   5/1999
(Continued)

OTHER PUBLICATIONS

Series, S. "Cross-layer QoS for IP-based hybrid satellite-terrestrial networks." (2011). http://www.itu.int/dms_pub/itu-r/opb/rep/r-rep-s.2222-2011-pdf-e.pdf (Section 5.1 on p. 17).
(Continued)

*Primary Examiner* — Pankaj Kumar
*Assistant Examiner* — Charles N Hicks

(57) ABSTRACT

A distribution system for transmitting media content programs to premises equipment via a satellite transmission path addresses signal degradation caused by atmospheric conditions and other factors. Upon detection of a degradation of the satellite signal, the system may begin transmitting the content using an alternative signal path, such as a terrestrial IP network. The satellite transmission path is brought back on line after the satellite link is restored. Alternatively, the system may begin recording the signal in the media distribution system for transmission via the satellite link after the link is restored.

20 Claims, 6 Drawing Sheets

Related U.S. Application Data continuation of application No. 15/040,644, filed on Feb. 10, 2016, now Pat. No. 9,800,915.

(51) Int. Cl.
| | |
|---|---|
| *H04N 21/61* | (2011.01) |
| *H04N 21/647* | (2011.01) |
| *H04H 40/90* | (2008.01) |
| *H04H 60/11* | (2008.01) |
| *H04H 60/82* | (2008.01) |
| *H04N 21/218* | (2011.01) |
| *H04N 21/2743* | (2011.01) |

(52) U.S. Cl.
CPC ..... *H04N 21/2181* (2013.01); *H04N 21/2743* (2013.01); *H04N 21/6143* (2013.01); *H04N 21/6193* (2013.01); *H04N 21/647* (2013.01); *H04H 2201/37* (2013.01)

(56) References Cited

U.S. PATENT DOCUMENTS

| | | | |
|---|---|---|---|
| 5,828,655 A | 10/1998 | Moura et al. | |
| 5,889,385 A | 3/1999 | Podrazhansky et al. | |
| 5,896,558 A | 4/1999 | Niedeman | |
| 7,039,048 B1 | 5/2006 | Vlonta et al. | |
| 7,075,919 B1 | 7/2006 | Nendt et al. | |
| 7,174,127 B2 | 2/2007 | Dtten et al. | |
| 7,526,249 B2 | 4/2009 | Waltman et al. | |
| 7,617,326 B2 | 11/2009 | Gervais et al. | |
| 7,656,813 B2 | 2/2010 | Kloper | |
| 7,706,747 B1 | 4/2010 | Rossell et al. | |
| 7,783,248 B1 | 8/2010 | Comeaux et al. | |
| 8,356,321 B2 | 1/2013 | Pham et al. | |
| 10,231,002 B2* | 3/2019 | Gilboy | H04N 21/266 |
| 2003/0217362 A1 | 11/2003 | Summers et al. | |
| 2005/0249139 A1 | 11/2005 | Nesbit | |
| 2008/0172692 A1 | 7/2008 | Kondo | |
| 2009/0193482 A1 | 7/2009 | White | |
| 2011/0047569 A1* | 2/2011 | Mears | H04N 5/4401 725/39 |
| 2013/0044611 A1 | 2/2013 | Jalali et al. | |
| 2014/0019593 A1 | 1/2014 | Reznik | |
| 2015/0189346 A1 | 7/2015 | Naik | |
| 2016/0173955 A1 | 6/2016 | Herman | |
| 2017/0171636 A1 | 6/2017 | Devlin | |

FOREIGN PATENT DOCUMENTS

| | | |
|---|---|---|
| EP | 1419593 A1 | 5/2004 |
| WO | 2015019274 A1 | 2/2015 |

OTHER PUBLICATIONS

Glover, Dan, and Mark Allman. "Enhancing TCP over satellite channels using standard mechanisms." (1999). http://tools.ietf.org/html/rfc2488.txt (Sections 4 to 4.1.3).

* cited by examiner

METHOD AND APPARATUS FOR SATELLITE TELEVISION SERVICE WITH ALTERNATE DELIVERY CAPABILITIES

CROSS-REFERENCE TO RELATED APPLICATIONS

This application is a continuation of application Ser. No. 15/704,309, entitled "METHOD AND APPARATUS FOR SATELLITE TELEVISION SERVICE WITH ALTERNATE DELIVERY CAPABILITIES," filed on Sep. 14, 2017, issued on Mar. 12, 2019 as U.S. Pat. No. 10,231,002, which is a continuation of application Ser. No. 15/040,644, entitled "METHOD AND APPARATUS FOR SATELLITE TELEVISION SERVICE WITH ALTERNATE DELIVERY CAPABILITIES," filed on Feb. 10, 2016, issued on Oct. 24, 2017 as U.S. Pat. No. 9,800,915, the contents of which are hereby incorporated by reference herein in their entirety.

TECHNICAL FIELD

Embodiments of the present disclosure relate to the delivery of media content using a satellite distribution network. Specifically, the disclosure relates to the delivery of media content under atmospheric or other conditions that interfere with or degrade a satellite signal.

BACKGROUND

The broadcast of television and multimedia signals using satellite links has expanded steadily in recent years. Satellite television providers can offer a large number of high quality channels without requiring additional terrestrial infrastructure. Providing reliability in a satellite broadcasting system is therefore an important goal of satellite broadcast providers.

Historically used frequency bands (L, S, C, or Ku bands) for satellite services have gradually become congested, leading to the use of higher frequency bands such as the Ka-band (20-30 GHz). The Ku- and Ka-bands are now used for a significant portion of multimedia communications. The Ka-band provides a larger bandwidth than is available at lower frequencies, and most satellite communications providers are moving toward utilization of that frequency band.

Ka-band, however, is more susceptible to rain and atmospheric attenuation than are the lower frequency bands, because the resonant frequency of molecular water vapor absorption is located within the band, at 22.3 GHz. The resulting signal fading causes random bit errors and also causes the transmission operation to be completely lost for short periods of time. The signal attenuation usually occurs in small geographic areas (2-8 km in diameter) relative to the footprint of the transmission-beam, which may be approximately 650 km in diameter. Reception quality and channel conditions may therefore vary from subscriber station to subscriber station.

In response to demand for additional bandwidth, commercial satellite system designers are considering even higher frequency bands, including the V-band (40-75 GHz), which is currently being used for military applications. While providing greatly increased bandwidth, those higher frequencies suffer from more severe multi-path fading and scattering of transmitted signals.

Customers of satellite television services may therefore experience brief service outages due to adverse weather conditions. The term "rain fade" is commonly used to describe the attenuated signal and noticeable degradation of image quality. That degradation can be caused by rain, snow, ice, etc. In some cases, the signal is fully disrupted and the customer experiences a total loss of the viewing channel. Customers must wait until the weather clears and the signal is returned to normal. That can be very discouraging to customers who may be enjoying a favorite television program or sporting event only to have the broadcast interrupted by a loss of signal.

There is therefore a need to improve the reliability and quality of service of satellite broadcasting services.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Figure 1:
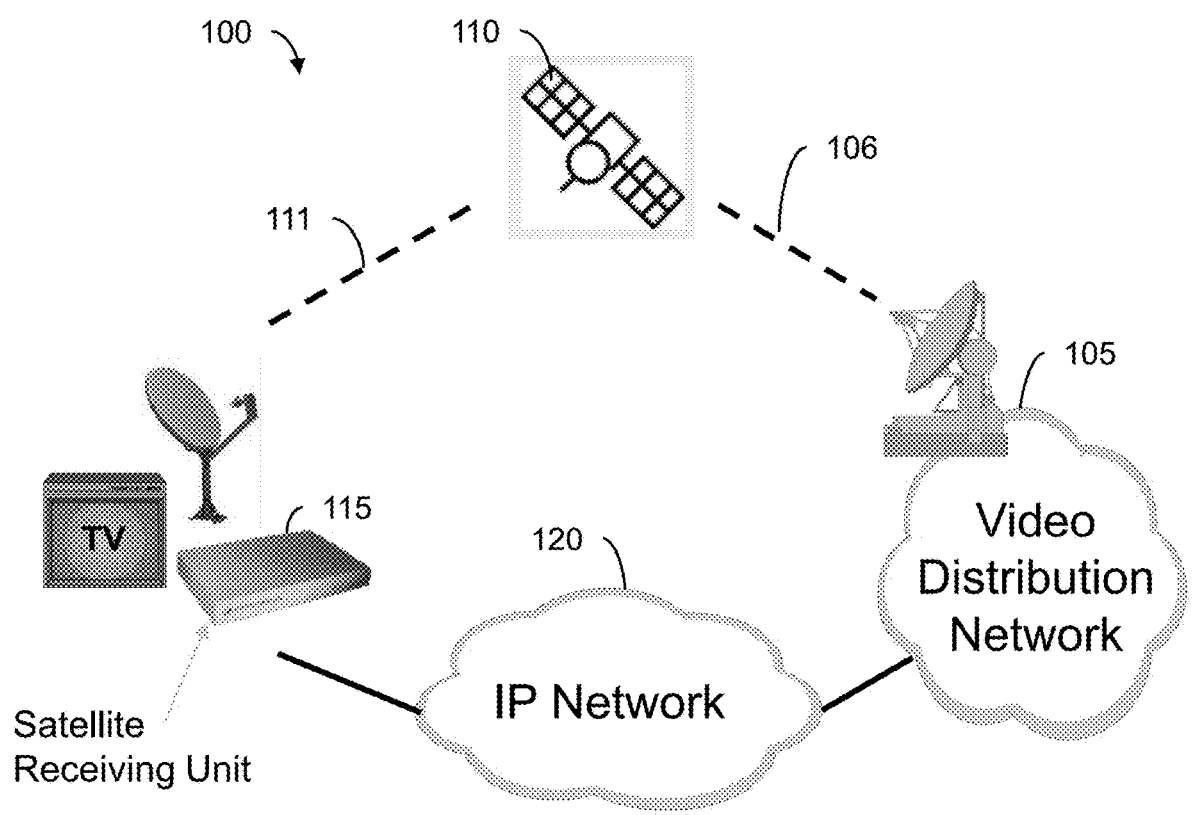
FIG. 1 is a block diagram showing a satellite media distribution system according to aspects of the present disclosure.

The disclosed system and method improve the viewing experience for customers of satellite content providers by providing an alternate, failover path to be initiated when the satellite link experiences a service outage due to adverse weather conditions or other causes.

In certain embodiments of the present disclosure, a method is provided for transmitting a subject media content program to premises equipment. The method is performed by a media distribution network server. A plurality of media content programs is transmitted to the premises equipment via a satellite transmission path. Those media content programs include the subject media program.

A first message is received from the premises equipment indicating a degradation of the satellite transmission path. That first message includes an identification of the subject media content program. In response to receiving the first message from the premises equipment, a first action is performed including transmitting the subject media content program to the premises equipment using one of an alternative transmission medium or an alternative transmission time.

A second message is then received from the premises equipment, the second message indicating a recovery of the satellite transmission path. In response to receiving the second message from the premises equipment, a second action is performed including discontinuing performance of at least a portion of the first action.

In embodiments, performing the first action comprises transmitting the subject media content program using the alternative transmission medium. In that case, performing the second action comprises discontinuing transmitting the subject media content program using the alternative transmission medium and resuming transmitting the plurality of media content programs including the subject media content program to the premises equipment using the satellite transmission path.

In other embodiments, performing the first action comprises transmitting the subject media content program using the alternative transmission time. That is done by making a recording of the subject media content program beginning after receiving the first message from the premises equipment indicating a degradation of the satellite transmission path. In that case, performing the second action comprises discontinuing making the recording of the subject media content program and transmitting the recording of the subject media content program to the premises equipment using the satellite transmission path.

In other aspects of the disclosure, a computer-readable storage device is provided having stored thereon computer readable instructions transmitting a subject media content program to a premises equipment, wherein execution of the computer readable instructions by a processor causes the processor to perform operations including receiving a first message from the premises equipment indicating a degradation of a satellite transmission path, the first message including an identification of a subject media content program; in response to receiving the first message from the premises equipment, performing a first action including transmitting the subject media content program to the premises equipment using one of an alternative transmission medium or an alternative transmission time; receiving a second message from the premises equipment indicating a recovery of the satellite transmission path; and, in response to receiving the second message from the premises equipment, performing a second action including discontinuing performance of at least a portion of the first action.

In another embodiment, a media content satellite distribution system is provided. The system includes premises equipment, a media distribution network server including a processor, a satellite network connection connecting the media distribution network server with the premises equipment, and a computer-readable storage device having stored thereon computer readable instructions for transmitting a subject media content program to a premises equipment. Execution of the computer readable instructions by a processor causes the processor to perform operations including receiving a first message from the premises equipment indicating a degradation of a satellite transmission path, the first message including an identification of a subject media content program currently being watched or recorded using the premises equipment; and, in response to receiving the first message from the premises equipment, performing a first action including transmitting the subject media content program to the premises equipment using one of an alternative transmission medium or an alternative transmission time. The operations further include receiving a second message from the premises equipment indicating a recovery of the satellite transmission path; and, in response to receiving the second message from the premises equipment, performing a second action including discontinuing performance of at least a portion of the first action.

An exemplary satellite media content distribution system 100 in accordance with embodiments of the present disclosure will be described with reference to FIG. 1. A video distribution network 105 includes content acquisition and storage servers, programming and subscription servers and satellite transmission equipment. The video distribution network 105 is connected with a satellite 110 by a satellite uplink 106. The satellite 110 is typically in a geosynchronous orbit and communicates with terrestrial equipment via the uplink 106 and a downlink 111 that utilize RF signals commonly in the microwave frequency band.

The downlink 111 connects the satellite 110 with a satellite receiving unit 115 that may include a set top box and a receiving antenna typically located on a subscriber's premises. As used herein, the term "premises equipment" refers to communications equipment deployed at a subscriber's premises, including the satellite receiving unit 115. The premises equipment may also include media viewing equipment and media recording/storage equipment. The downlink may comprise one or more transmission beams, each having a footprint diameter on the order of 1000 km. Each transmission beam therefore serves a large number of satellite receiving units 115 located within the beam footprint at subscribers' premises.

The satellite receiving unit 115 and the video distribution network 105 may also be interconnected via a terrestrial network such as the IP network 120. The IP network may connect to the satellite receiving unit 115 via a cable network, an optical fiber network, a hybrid (HFC) network, a wireless data network such as a long term evolution (LTE) network, a public switched telephone network (PSTN) or another data connection. The IP network connection 120 may be an existing connection used as a return channel for the satellite network, or as a feedback channel. In certain embodiments of the present disclosure, no network 120 is available.

As shown in the flowchart 200 depicting a method according to embodiments of the present disclosure, upon starting (block 210) content delivery, the satellite receiving unit 115 continuously monitors (block 215) the incoming satellite signal in order to detect a degradation of the signal. As noted above, the signal may degrade locally due to atmospheric conditions, resulting in the detection of degradation in a subset of the subscriber premises within a beam footprint, while other subscriber premises in the footprint continue to receive a non-degraded signal. By monitoring the received signal at the premises equipment, variations in signal degradation within the beam footprint are accounted for.

The degradation or loss of a signal is detected (block 220) based on a parameter such as a received forward error bit count. The parameter may be a threshold set by the satellite service provider based on acceptable QoS metrics. Alternatively, the threshold parameter may be set based on a subscription level chosen by the subscriber, with lower error thresholds being available for additional cost to the subscriber.

Upon detection of a signal degradation, the premises equipment transmits to a video distribution network server in the video distribution network a first message (block 225) indicating the degradation of the signal. The message also includes an identification of a channel of channels currently being watched or recorded by the premises equipment.

The first message may be transmitted using a return transmission path to the satellite itself. In that case, the detection of the signal degradation must be made sufficiently in advance of total loss of signal in order to insure that sufficient transmission capability remains to transmit the first message. Such an arrangement assumes a somewhat gradual degradation of the signal, which is normally the case with atmospheric interference.

Alternatively, the first message may be transmitted from the premises equipment to the video distribution network server using an alternate transmission medium such as the terrestrial IP network 120 (FIG. 1). Because of its low bandwidth requirements, the first message may alternatively be transmitted via a PSTN or another low-bandwidth medium. In either case, the message may then be transmitted regardless of the condition of the satellite link.

Figure 2:
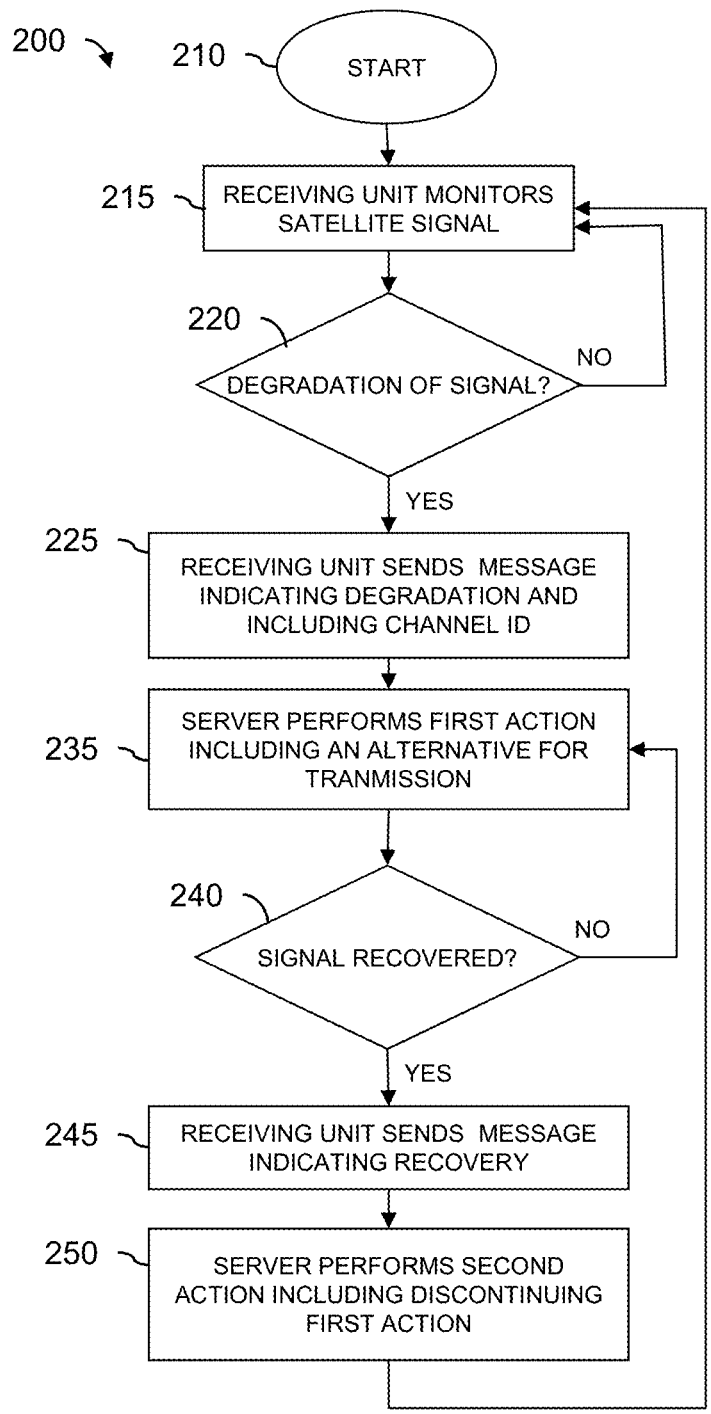
FIG. 2 is a flow chart showing a method according to aspects of the present disclosure.

In response to receiving the first message, the video distribution network server performs a first action (block 235, FIG. 2). The first action includes using an alternative to transmit the content that was currently being watched or recorded. The alternative may be an alternative transmission medium or may be an alternative transmission time, as discussed in more detail below.

The premises receiving unit continues to monitor the satellite signal quality and makes a determination (block 240) that the signal has recovered. That determination may be made based on the same threshold used for determining that there was a degradation of signal (block 220), or a different threshold or metric may be used.

Upon signal recovery, the premises receiving unit transmits a second message (block 245) to the video distribution network server indicating that the satellite signal is acceptable. That transmission may be made using the recovered satellite link, or may be transmitted via an alternative path such as the terrestrial IP network 120. Upon receiving the second message, the video distribution network server performs a second action (block 240) that includes discontinuing at least a portion of the first action.

Details of embodiments of the disclosure that may be used with a system in which an alternative transmission medium, such as the IP network 120 of FIG. 1, is available will now be described with reference to FIGS. 3 and 4. Upon starting content delivery (block 310), the satellite receiving unit 115 monitors (block 315) the incoming satellite signal for signal degradation. The degradation or loss of a signal is detected (block 320) using a threshold metric as discussed above.

When the premises equipment detects a loss or degradation of the signal, it determines which channel or channels were being viewed or recorded at the time that the determination was made. That information is transmitted (block 325) from the premises equipment to a video distribution network server in the video distribution network 105 in a message indicating that the signal degradation or loss has occurred. At the video distribution network server, a lookup is performed (block 330) that correlates the lost channel(s) with content programming on that channel.

Authentication information is then provided (block 335) to the video distribution network server by the premises equipment, or is retrieved by the video distribution network server based on an identity of the premises equipment. The authentication information identifies the premises equipment as being associated with a satellite service subscription, and is used to prevent fraud. The authentication information may also indicate that a subscriber subscribes to a backup delivery service. Where multiple grades of the backup delivery service are available, the authentication information identifies the service grade. For example, a number of threshold minimum satellite reception quality levels may be available, below which the backup delivery service is activated. In another example, a number of backup media stream resolutions may be available, such as 1080, 720 and 480 line resolutions. Backup delivery service subscriptions may be priced according to such parameters. In such cases, the authentication information contains subscription information reflecting those parameters.

The video distribution network server then causes an alternate media stream to be transmitted to the premises equipment using the alternative transmission medium, such as the IP network 120 of FIG. 1. The alternate media stream contains those channels determined (block 325) to have been recorded or viewed at the time of the signal degradation. The alternate media stream may be transmitted by the video distribution network as an IP packet stream. The video distribution network server may alternatively cause another service or entity to stream the content. In any case, the alternative media stream utilizes a transport medium that is unaffected by the degradation of the satellite link.

The alternative media stream is then displayed by the premises equipment (block 340). In embodiments, the alternative media stream is initiated to begin transmission at a point in the content where the satellite signal was degraded or was lost. In that way, a subscriber may continue to watch or record a program with a minimum of disturbance. In the case where the satellite signal degrades gradually and the system can prepare for the transmission, it is expected that the subscriber will experience little or no interruption in viewing.

With the alternative signal being received at the premises via the alternative transmission medium, the premises equipment continues to monitor the satellite signal (block 345) to determine whether the signal has recovered. As with monitoring for signal degradation, the premises equipment may use threshold values to determine a point at which the signal has recovered sufficiently to reinstate satellite viewing. When that point is reached (block 350), transmission of the alternative signal is discontinued and the alternative signal is replaced with the recovered satellite signal (block 355). The system resumes monitoring the satellite signal for degradation (block 315).

Figure 3:
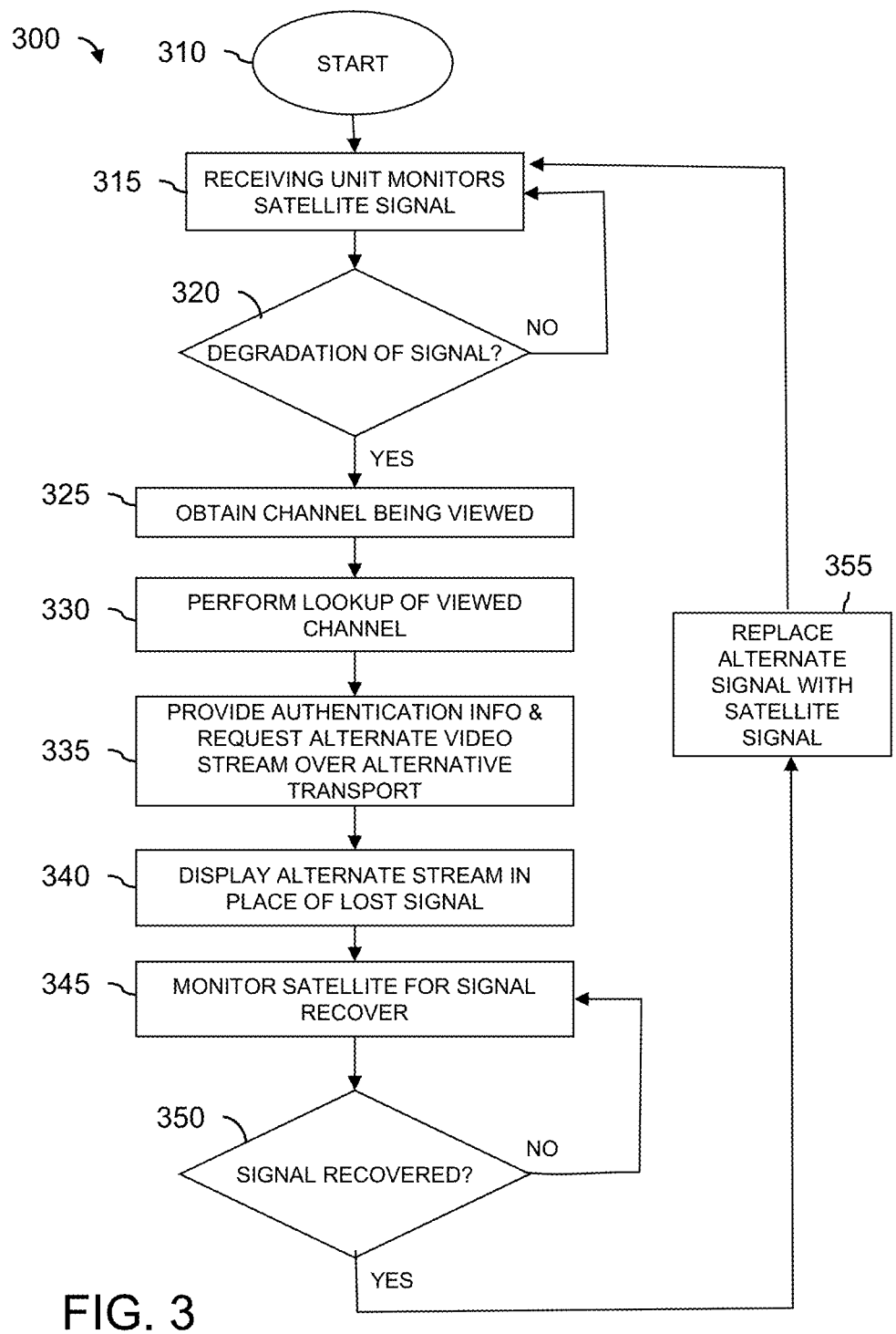
FIG. 3 is a flow chart showing a method according to one embodiment of the present disclosure.
Figure 4:
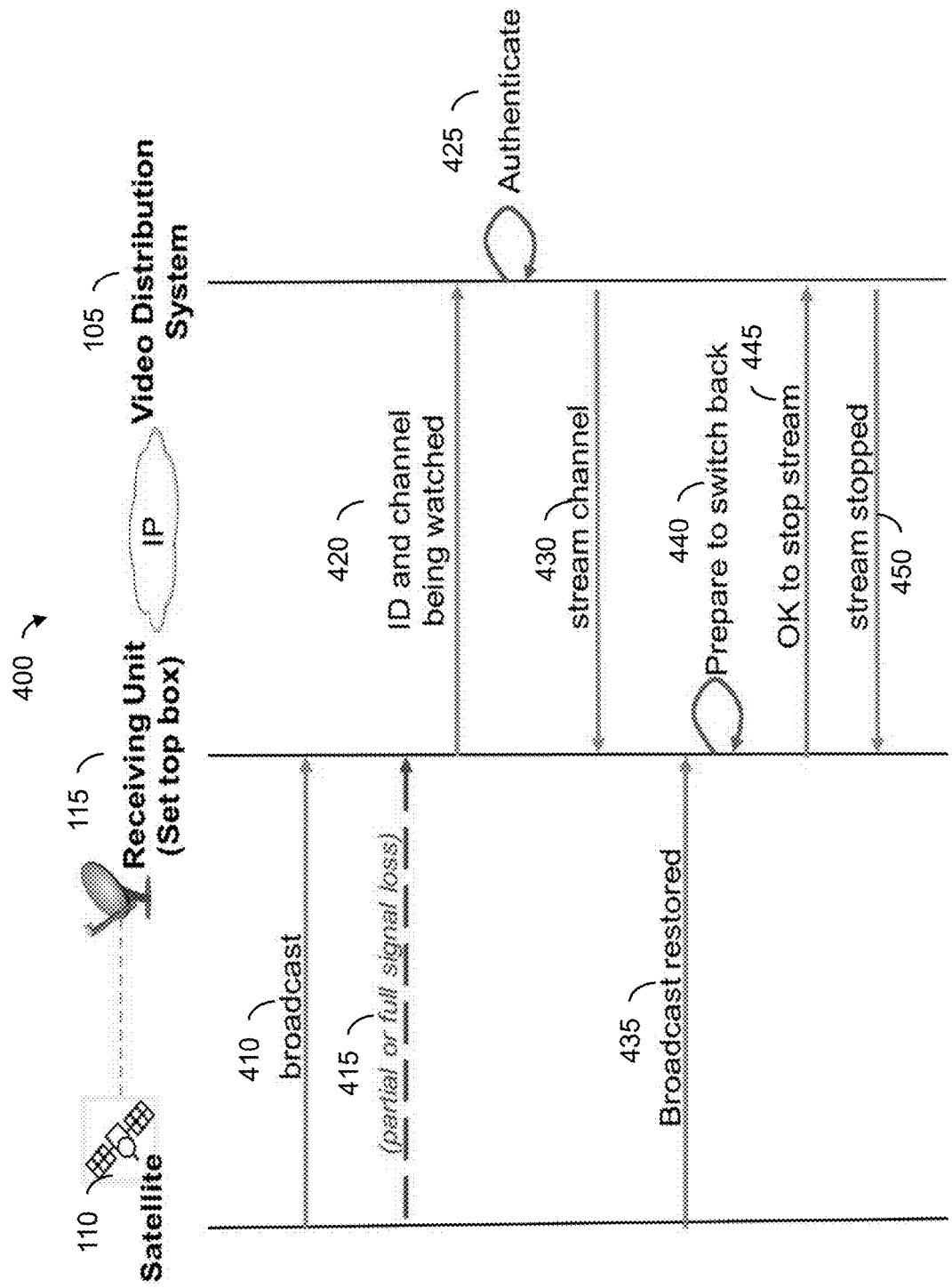
FIG. 4 is a timing chart showing a sequence of communications according to aspects of the present disclosure.

A sequence of messages among the various network elements of the system and method disclosed with reference to FIG. 3 is illustrated in the timing chart 400 shown in FIG. 4. A broadcast 410 is transmitted by the satellite 110 to the receiving unit 115 located at a premises. One or more channels of the broadcast may be of interest to a subscriber because they are being watched or recorded using premises equipment. During the broadcast, a full or partial signal loss 415 occurs as a result of atmospheric conditions such as rain damping and rain depolarization. A message 420 is then sent by the receiving unit 115 to the video distribution system 105 via the IP network, indicating that the signal is degraded and identifying the channel or channels of interest that are being watched or recorded.

An authentication 425 is performed by the video distribution system 105 to validate the subscriber and, in some embodiments, determine a level of alternate media delivery service to which the subscriber is subscribed. After the subscriber is authenticated, the particular channel or channels being watched or recorded are streamed via an IP stream 430 from the video distribution system 105 to the receiving unit 115. The stream 430 preferably begins at a point in the content where the signal loss 415 occurred. The streamed channel is received by the receiving unit 115 and is watched or recorded using premises equipment.

At a later point in time, the signal broadcast by the satellite 110 is restored, and the restored signal 435 is detected by the receiving unit 115. The receiving unit then makes preparations 440 to switch back to viewing and/or recording the restored satellite signal. Once the received satellite signal has been substituted for the streamed channels, a message 445 is sent to from the receiving unit 115 to the video distribution system 105 to cease streaming the channels, and the video distribution system 105 stops the transmission 450.

Figure 5:
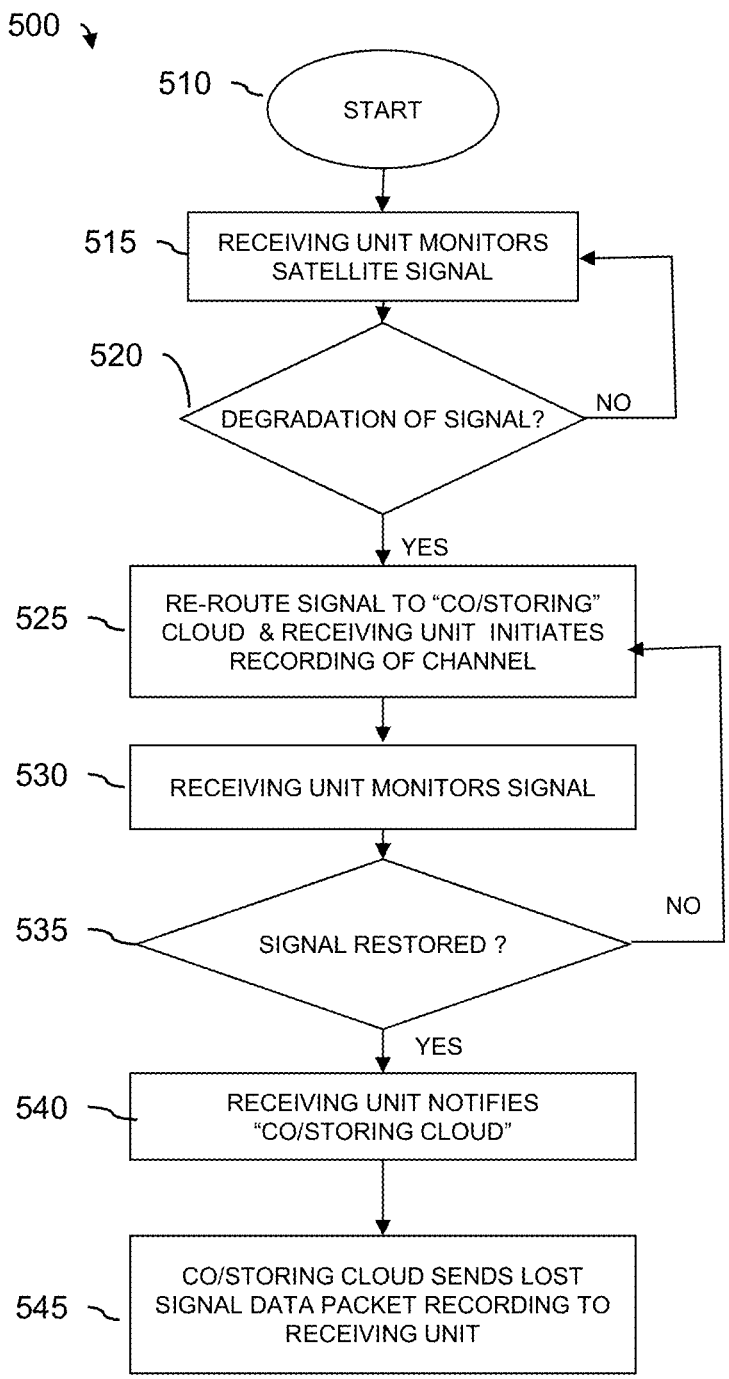
FIG. 5 is a flow chart showing a method according to another embodiment of the present disclosure.

An alternative method 500, shown in FIG. 5, may be implemented in cases where an alternative, relatively high bandwidth transmission medium such as the IP network 120 is not required. This embodiment may be used, for example, in remote areas where no terrestrial communications infrastructure is available, or in cases where a subscriber chooses not to be connected to a terrestrial communications network. In the embodiment, the subject media content is transmitted using an alternative transmission time.

Upon starting content delivery (block 510), the satellite receiving unit 115 monitors (block 515) the incoming satellite signal for signal degradation. The degradation or loss of a signal is detected (block 520) using a threshold metric as discussed above.

Upon the detection of a degradation or loss of signal, the satellite receiving unit launches a request (block 525) to re-route the signal to be recorded by a storage facility such as a cloud storage facility. The signal that is recorded comprises channels that were being watched or recorded using the premises equipment at the time of the signal degradation. If channels or programs were scheduled for later recording, and the satellite link is not restored before the recording is scheduled, then those channels or programs may also be included in the signal to be recorded. The storing facility records the program only while service is interrupted.

As the rerouted programs are being recorded by the storing facility, the satellite receiving unit continues to monitor the satellite signal (block 530). When a determination is made that the signal is restored (block 535), the satellite receiving unit notifies the storing facility (block 540) and discontinues rerouting the signal to the storage facility. The storing facility then discontinues the recording and transmits the recorded portion of the program(s) (block 545) via the restored satellite link to the satellite receiving unit. The program transmission therefore effectively takes place at an alternative, later time, when the satellite link has been recovered.

Additionally, upon the determination that the signal is restored (block 535), the satellite receiving unit at the subscriber's premises begins recording the remaining portions of the program(s) of interest so that the programs can be watched in chronological order once the signal is restored. In particular, once satellite service is restored and the first portion of a program stored by the cloud storage facility is transmitted to the satellite receiving unit, the subscriber may begin watching the program in chronological order, first watching the first portion, which was recorded by the cloud storage facility, and then watching a second portion, which was recorded by the premises equipment after the satellite services were restored. The viewing transition between the first and second recorded portions of the program may be automatic and transparent to the subscriber.

Figure 6:
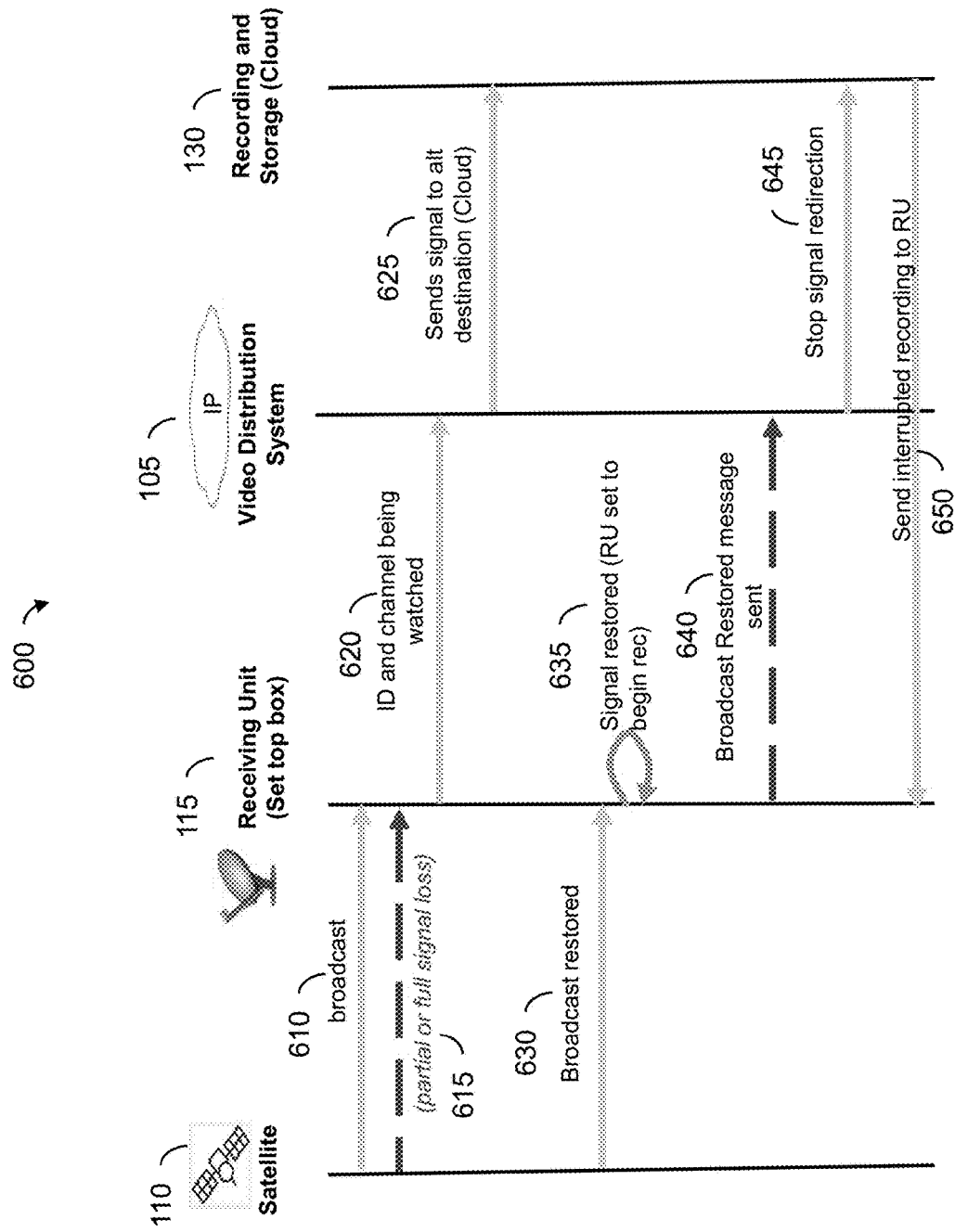
FIG. 6 is a timing chart showing another sequence of communications according to aspects of the present disclosure.

A sequence of messages among the various network elements illustrating the method 500 of FIG. 5 is illustrated in the timing chart 600 shown in FIG. 6. A broadcast 610 is transmitted by the satellite 110 to the receiving unit 115 located at a premises. During the broadcast, a full or partial signal loss 615 occurs as a result of atmospheric or other conditions. A message 620 is then sent by the receiving unit 115 to the video distribution system 105 via the IP network, indicating that the signal is degraded and identifying which channel or channels are being watched or recorded.

In response to receiving the message 620, the video distribution system 105 begins transmitting a stream 625 containing the channel or channels being watched or recorded to a cloud storage facility 130. The stream 625 may be transmitted via a terrestrial IP network. The storage facility 130 may be collocated with the video distribution system 105 or may be a storage facility in the cloud. The program content contained in the stream 625 preferably begins at a point in the content where the signal loss 615 occurred. The stream 625 is received and recorded by the cloud storage facility 130.

At a later point in time, the signal broadcast by the satellite 110 is restored, and the restored signal 630 is detected 635 by the receiving unit 115. Upon detection of the restored signal 630 by the receiving unit 115, the receiving unit at the premises begins recording the channel or channels being watched or recorded at the time that the signal was lost. Upon detection of the restored signal 630, the receiving unit 115 also sends a message 640 to the video distribution system 105 indicating that the satellite signal is restored. In response to receiving the message 640, the video distribution system 105 discontinues transmission 645 of the media stream to the cloud storage facility 130. The recorded portions of the media programs are then transmitted 650 to the receiving unit 115.

After completion of the sequence 600, the receiving unit 115 has complete recorded copies of the programs on each of the subject channels. Those programs may be watched in chronological order by first watching the portion recorded at the cloud storage facility 130, and then watching the portion recorded at the receiving unit 115. As the programs are watched, transition between the two portions is automatic and transparent to the subscriber.

The disclosed systems and methods function to allow satellite service to be viewed without gaps in the program, even after an interruption caused by signal degradation. The technique may be used both for channels being viewed and for channels being recorded on a DVR collocated in the premises with the satellite receiving unit.

The above-described service maybe offered by a satellite service provider as an optional alternate delivery service, and the subscriber may be billed a monthly fee for the services. Several differentiated levels of the service maybe offered to a subscriber. For example, services may be differentiated based on a minimum threshold quality of service, below which the alternate delivery service is triggered. The services may also be differentiated based on a quality or resolution of the programs recorded by the storage facility and transmitted to the premises equipment.

The hardware and the various network elements discussed above comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for transmitting a subject media content program to a premises equipment, comprising:
    by a media distribution network server, receiving authentication information from the premises equipment indicating that the premises equipment is associated with a satellite service subscription and is further associated with a backup delivery service subscription designating a threshold minimum satellite reception quality level associated with a satellite transmission path to the premises equipment and further designating a backup media stream resolution associated with the premises equipment;
    by the media distribution network server, transmitting to the premises equipment, via the satellite transmission path, a plurality of media content programs including the subject media content program;
    by the media distribution network server, receiving a first message from the premises equipment indicating that a satellite reception quality level of the satellite transmission path is below the threshold minimum satellite reception quality level associated with the premises equipment, the first message including an identification of the subject media content program;
    by the media distribution network server, in response to receiving the first message from the premises equipment and to receiving the authentication information, transmitting the subject media content program to the premises equipment using a terrestrial network, the transmitting being at the backup media stream resolution associated with the premises equipment;
    by the media distribution network server, receiving a second message from the premises equipment indicating that the satellite reception quality level of the satellite transmission path is above the threshold minimum satellite reception quality level; and
    by the media distribution network server, in response to receiving the second message from the premises equipment, discontinuing the transmitting of the subject media content program to the premises equipment using the terrestrial network.

2. The method of claim 1, further comprising:
    by the media distribution network server, receiving a selection of the backup media stream resolution associated with the premises equipment, the selection being from a plurality of available backup media stream resolutions.

3. The method of claim 1, wherein the backup delivery service is priced according to the backup media stream resolution.

4. The method of claim 1, wherein the backup media stream resolution associated with the premises equipment is selected from a group of line resolutions consisting of 1080, 720 and 480 line resolutions.

5. The method of claim 1, wherein the backup delivery service is priced according to the threshold minimum satellite reception quality level.

6. The method of claim 1, wherein the terrestrial network comprises one or more media selected from a group consisting of a land-based Internet protocol network, a wireless 4G long term evolution (LTE) network, a land-based cable network, a land-based fiber network and a land-based hybrid fiber/cable (HFC) network.

7. The method of claim 1, wherein receiving the first and second messages further comprises receiving the first and second messages via the terrestrial network.

8. The method of claim 1, wherein the threshold minimum satellite reception quality level is a rate parameter based on received forward error bits.

9. The method of claim 1, wherein the subject media content program is a program currently being viewed using the premises equipment.

10. The method of claim 1, wherein the subject media content program is a program currently being recorded or scheduled to be recorded using the premises equipment.

11. A computer-readable storage device having stored thereon computer readable instructions for transmitting a subject media content program to a premises equipment, wherein execution of the computer readable instructions by a processor causes the processor to perform operations comprising:

receiving authentication information from the premises equipment indicating that the premises equipment is associated with a satellite service subscription and is further associated with a backup delivery service subscription designating a threshold minimum satellite reception quality level associated with a satellite transmission path to the premises equipment and further designating a backup media stream resolution associated with the premises equipment;

transmitting to the premises equipment, via the satellite transmission path, the subject media content program;

receiving a first message from the premises equipment indicating that a satellite reception quality level of the satellite transmission path is below the threshold minimum satellite reception quality level associated with the premises equipment, the first message including an identification of the subject media content program;

in response to receiving the first message from the premises equipment and to receiving the authentication information, transmitting the subject media content program to the premises equipment using a terrestrial network, the transmitting being at the backup media stream resolution associated with the premises equipment;

receiving a second message from the premises equipment indicating that the satellite reception quality level of the satellite transmission path is above the threshold minimum satellite reception quality level; and in response to receiving the second message from the premises equipment, discontinuing the transmitting of the subject media content program to the premises equipment using the terrestrial network.

12. The computer-readable storage device of claim 11, the operations further comprising:

receiving a selection of the backup media stream resolution associated with the premises equipment, the selection being from a plurality of available backup media stream resolutions.

13. The computer-readable storage device of claim 11, wherein the backup delivery service is priced according to the backup media stream resolution.

14. The computer-readable storage device of claim 11, wherein the backup media stream resolution associated with the premises equipment is selected from a group of line resolutions consisting of 1080, 720 and 480 line resolutions.

15. The computer-readable storage device of claim 11, wherein the backup delivery service is priced according to the threshold minimum satellite reception quality level.

16. A media content satellite distribution system comprising:

a premises equipment, a media distribution network server including a processor;

a satellite transmission connection connecting the media distribution network server with the premises equipment;

a terrestrial network connecting the media distribution network server with the premises equipment; and a computer-readable storage device having stored thereon computer readable instructions for transmitting a subject media content program to the premises equipment, wherein execution of the computer readable instructions by a processor causes the processor to perform operations comprising:

receiving authentication information from the premises equipment indicating that the premises equipment is associated with a satellite service subscription and is further associated with a backup delivery service subscription designating a threshold minimum satellite reception quality level associated with the satellite transmission connection to the premises equipment and further designating a backup media stream resolution associated with the premises equipment;

transmitting to the premises equipment, via the satellite transmission connection, a plurality of media content programs including the subject media content program;

receiving a first message from the premises equipment indicating that a satellite reception quality level of the satellite transmission connection is below the threshold minimum satellite reception quality level associated with the premises equipment, the first message including an identification of the subject media content program;

in response to receiving the first message from the premises equipment and to receiving the authentication information, transmitting the subject media content program to the premises equipment using the terrestrial network, the transmitting being at the backup media stream resolution associated with the premises equipment;

receiving a second message from the premises equipment indicating that the satellite reception quality level of the satellite transmission connection is above the threshold minimum satellite reception quality level; and in response to receiving the second message from the premises equipment, discontinuing the transmitting of the subject media content program to the premises equipment using the terrestrial network.

17. The media content satellite distribution system of claim 16, the operations further comprising:

receiving a selection of the backup media stream resolution associated with the premises equipment, the selection being from a plurality of available backup media stream resolutions.

18. The media content satellite distribution system of claim 16, wherein the backup delivery service is priced according to the backup media stream resolution.

19. The media content satellite distribution system of claim 16, wherein the backup media stream resolution associated with the premises equipment is selected from a group of line resolutions consisting of 1080, 720 and 480 line resolutions.

20. The media content satellite distribution system of claim 16, wherein the backup delivery service is priced according to the threshold minimum satellite reception quality level.

* * * * *